United States Patent [19]
Kaya et al.

[11] Patent Number: 5,455,905
[45] Date of Patent: Oct. 3, 1995

[54] ELECTRONIC COMMUNICATION DEVICE FOR COMMUNICATION BETWEEN AN OVERHEAD PROJECTION DISPLAY DEVICE AND AN INPUT DEVICE THEREFOR

[75] Inventors: Syuuji Kaya; Michiaki Kuno, both of Yamato-Koriyama, Japan

[73] Assignee: Sharp Kabushiki Kaisha, Osaka, Japan

[21] Appl. No.: 88,239

[22] Filed: Jul. 7, 1993

[30] Foreign Application Priority Data

Jul. 13, 1992 [JP] Japan ................... 4-185187

[51] Int. Cl.⁶ .................................................. G06F 15/00
[52] U.S. Cl. ........................................................ 395/162
[58] Field of Search ............................. 395/162; 364/700, 364/705.05, 706, 709.09, 709.1, 788, 737, 927.2; 345/1, 2, 3, 168, 169

[56] References Cited

U.S. PATENT DOCUMENTS

| | | | |
|---|---|---|---|
| 4,154,007 | 5/1979 | Judd | 35/39 |
| 4,908,786 | 3/1990 | Kuno et al. | 364/710.11 |
| 4,939,509 | 7/1990 | Bartholomew et al. | 340/717 |
| 4,974,173 | 11/1990 | Stefik et al. | 364/521 |
| 5,231,434 | 7/1993 | Kennedy et al. | 353/122 |
| 5,274,363 | 12/1993 | Koved et al. | 345/2 |
| 5,283,861 | 2/1994 | Dangler et al. | 395/149 |
| 5,329,444 | 7/1994 | Takahashi et al. | 364/401 |

*Primary Examiner*—Mark R. Powell
*Assistant Examiner*—U. Chauhan
*Attorney, Agent, or Firm*—David G. Conlin; Brian Michaelis

[57] ABSTRACT

An electronic connecting system is arranged to have an electronic main body, a display device and a communication device connecting both of them with each other. The main body includes an input section, a first processing section, a first storage section, a first display section, and a first communication section. The data is input through the input section and is processed in the processing section based on the application stored in the storage section. The processed result appears on the display section and is sent to the display device through the communication section. The display device includes a second communication section, a second storage section, a second processing section, and a second display section. The input key codes and the application is sent from the main body to the display device through the second communication section. The application is stored in the second storage section. The processing section processes the input key codes based on the application. The processed result is displayed on the second display section.

7 Claims, 9 Drawing Sheets

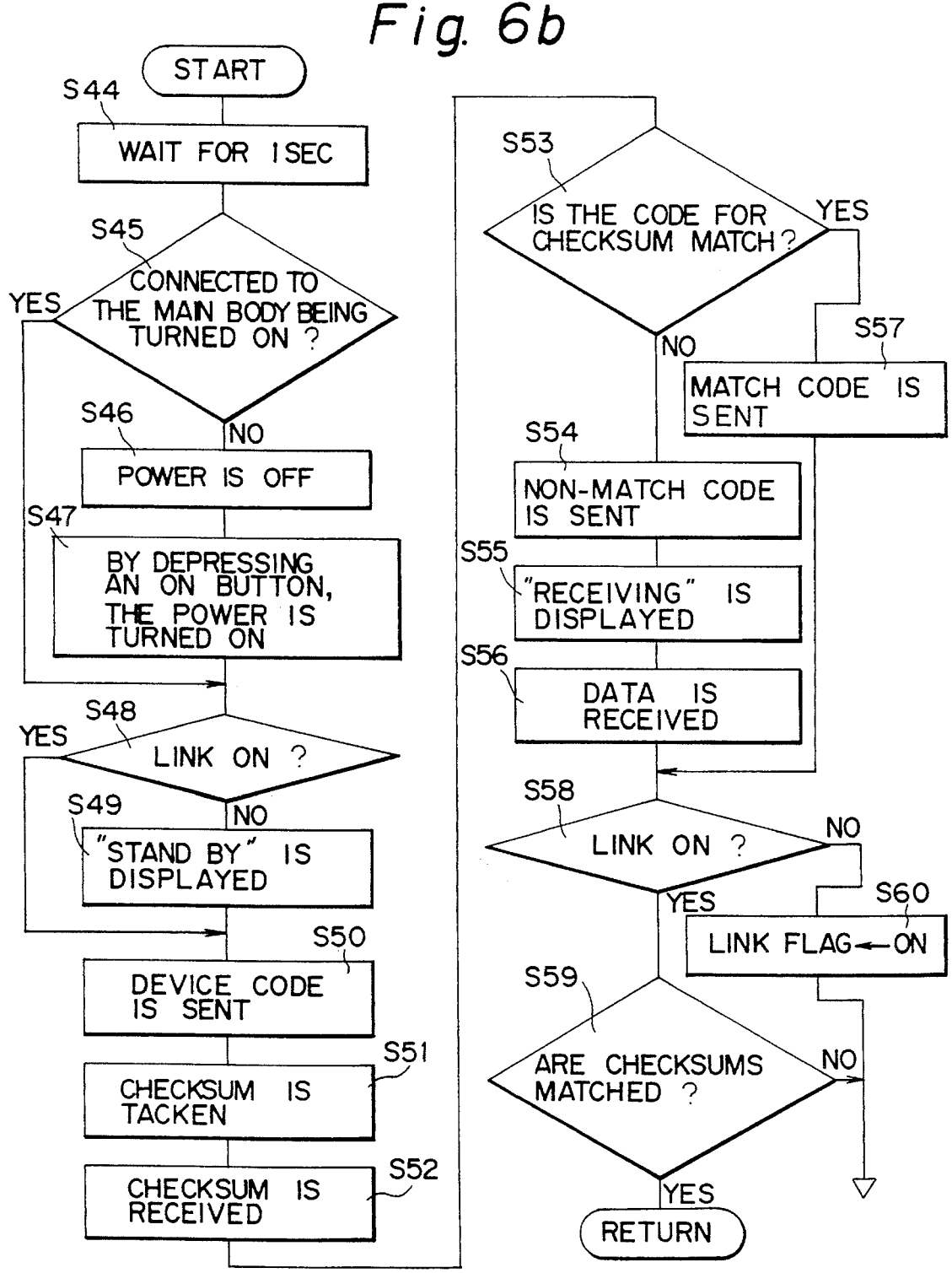

ELECTRONIC COMMUNICATION DEVICE FOR COMMUNICATION BETWEEN AN OVERHEAD PROJECTION DISPLAY DEVICE AND AN INPUT DEVICE THEREFOR

BACKGROUND OF THE INVENTION

1. Field of the Invention

The present invention relates to an electronic connecting system which may be connected with a device dedicated to display information such as an OHP (Over Head Projector) or a display for indicating a handling routine for electronic equipment like an electronic calculator or an electronic note provided with such a function.

2. Description of the Related Art

As a known representative art, the OHP projection for an electronic function calculator will be described. The inventors of the present application know two proposed techniques. The first known technique is arranged to directly mount an electronic function calculator onto an OHP device and display the calculation being done by a handling operation on the OHP large display. The second known technique is arranged to connect an electronic function calculator with a device dedicated to OHP projection through a communication cable and mount the dedicated device onto the OHP device. In this arrangement, a user handles the electronic function calculator so that the handled result may be displayed on the display section of the calculator. At a time, the display data based on the handled result is transmitted to the dedicated device through the communication cable and displayed on the display section of the dedicated device so that the display data may appear on the OHP large screen for indicating a handling explanation to the audience.

Unfortunately, however, the first known technique has a shortcoming that this technique is difficult to handle because the function calculator is required to be placed on the OHP device. As a further shortcoming, it gives a handler difficulty in seeing the handling process on the display. As another shortcoming, the handler is required to be around the OHP device.

As shortcomings of the second known technique, it needs to provide a larger number of communication lines for feeding a larger number of communication lines (parallel communication) because it feeds a display signal or its converted signal indicating the result processed by the electronic function calculator or an additional dedicated circuit (parallel signal) because it needs a longer communication time. Further, since the circuitry on the sending side is quite different from that on the receiving side, such a device dedicated to display makes the electronic function calculator itself expensive.

SUMMARY OF THE INVENTION

It is an object of the present invention to provide an electronic connecting system which may be connected with a device dedicated to display for OHP projection so that only key codes may be used for communication therebetween and the handling may be done on the electronic device and the display may be done on the display dedicated display.

In carrying out an object in a preferred mode, an electronic connecting system includes an electronic main body, a display device, and a communication device connecting the electronic main body with the display device, the electronic main body having input means for inputting data through keys, first storage means for storing application data, first processing means for processing key codes input by the input means based on the application data stored in the first storage means, first display means for displaying a result processed by the first processing means, and first communication means for communicating the key codes input by the input means and the application data stored in the first storage means; and the display device having second communication means for communicating the key codes and the application data communicated from the first communication means, second storage means for storing the application data communicated from the second communication means, second processing means for processing the key codes processed by the second communication means based on the application data stored in the second storage means, and second display means for displaying a result processed by the second processing means.

In function, as mentioned above, the electronic main body is connected with the display dedicated device through the communication device so that the application data stored in the first storage means included in the electronic main body may be communicated to the display dedicated device for storing it in the second storage means. As a result, the application data stored in the first storage means is the same as that stored in the second storage means. A user operates to send some key codes to the display dedicated device through the input means included in the electronic main body so that the key codes may be processed on the application data stored in the first storage means and may be processed on the same stored in the second storage means. Unlike the known techniques, it is not necessary to communicate the display signal. This results in reducing the number of necessary communication lines and the time taken in doing communication. Further, this invention eliminates the necessity of directly mounting the electronic main body to the OHP device so that a user may more easily handle it.

Further objects and advantages of the present invention will be apparent from the following description of the preferred embodiments of the invention as illustrated in the accompanying drawings.

BRIEF DESCRIPTION OF THE DRAWINGS

FIG. 6b is a flowchart showing a power off processing executed in the display device of the system;

DESCRIPTION OF THE PREFERRED EMBODIMENTS

Figure 1:
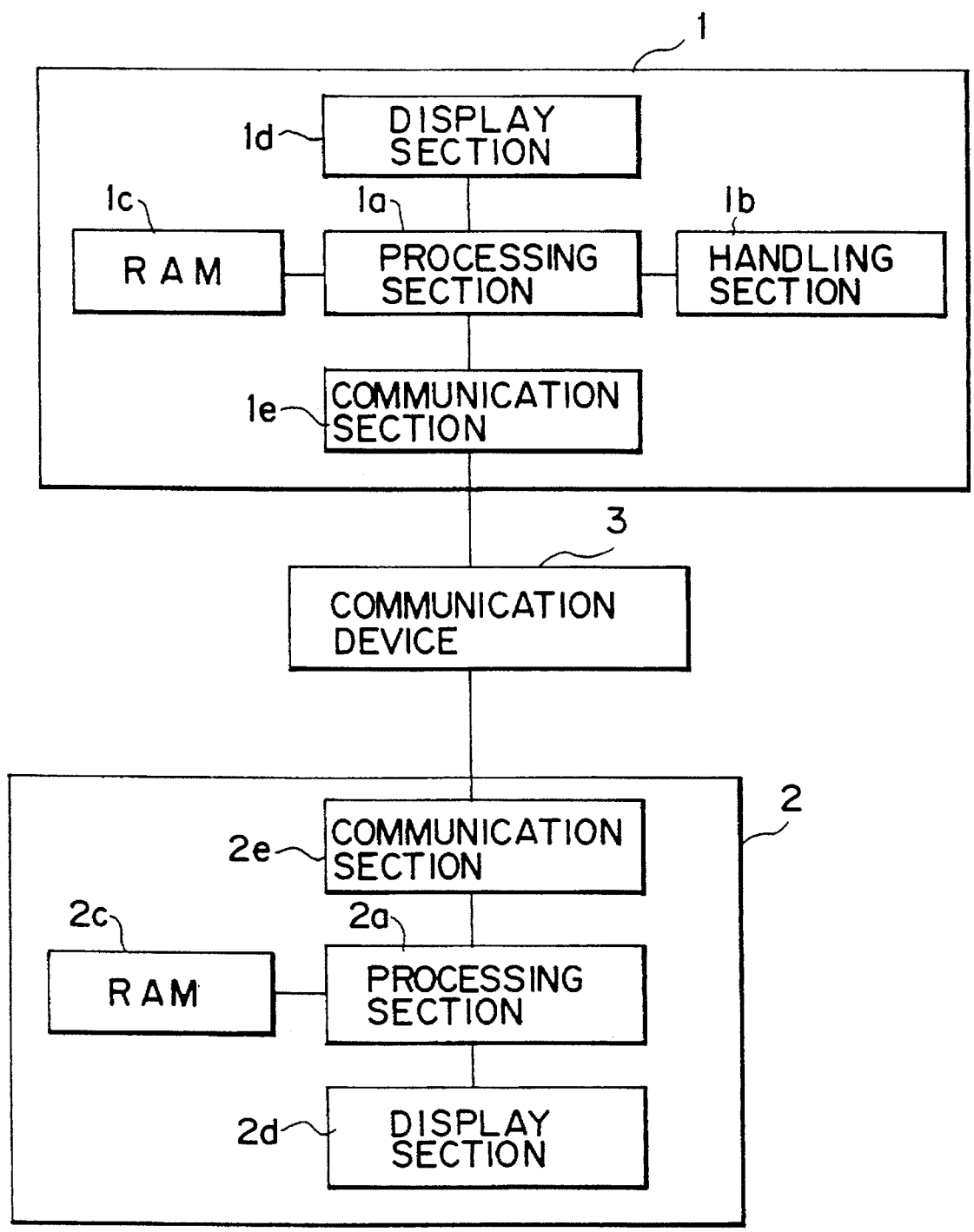
FIG. 1 is a block diagram showing an electronic connecting system according to an embodiment of the invention.

Now, the description will be oriented to the system according to an embodiment of the present invention as referring to the drawings. FIG. 1 is a block diagram showing the system according to this embodiment.

As shown in FIG. 1, the system according to the invention is arranged to have a main body 1 such as an electronic function calculator, a display dedicated device 2, and a communication facility 3 for connecting the main body 1 with the display device 2. The main body 1 includes a processing section 1a, a handling section 1b, a RAM 1c, a display section 1d, and a communication section 1e. The display device 2 includes a processing section 2a, a RAM 2c, a display section 2d and a communication section 2e.

Later, the operation of this embodiment will be described as referring to the flowcharts shown in FIGS. 2 to 7.

Figure 2:
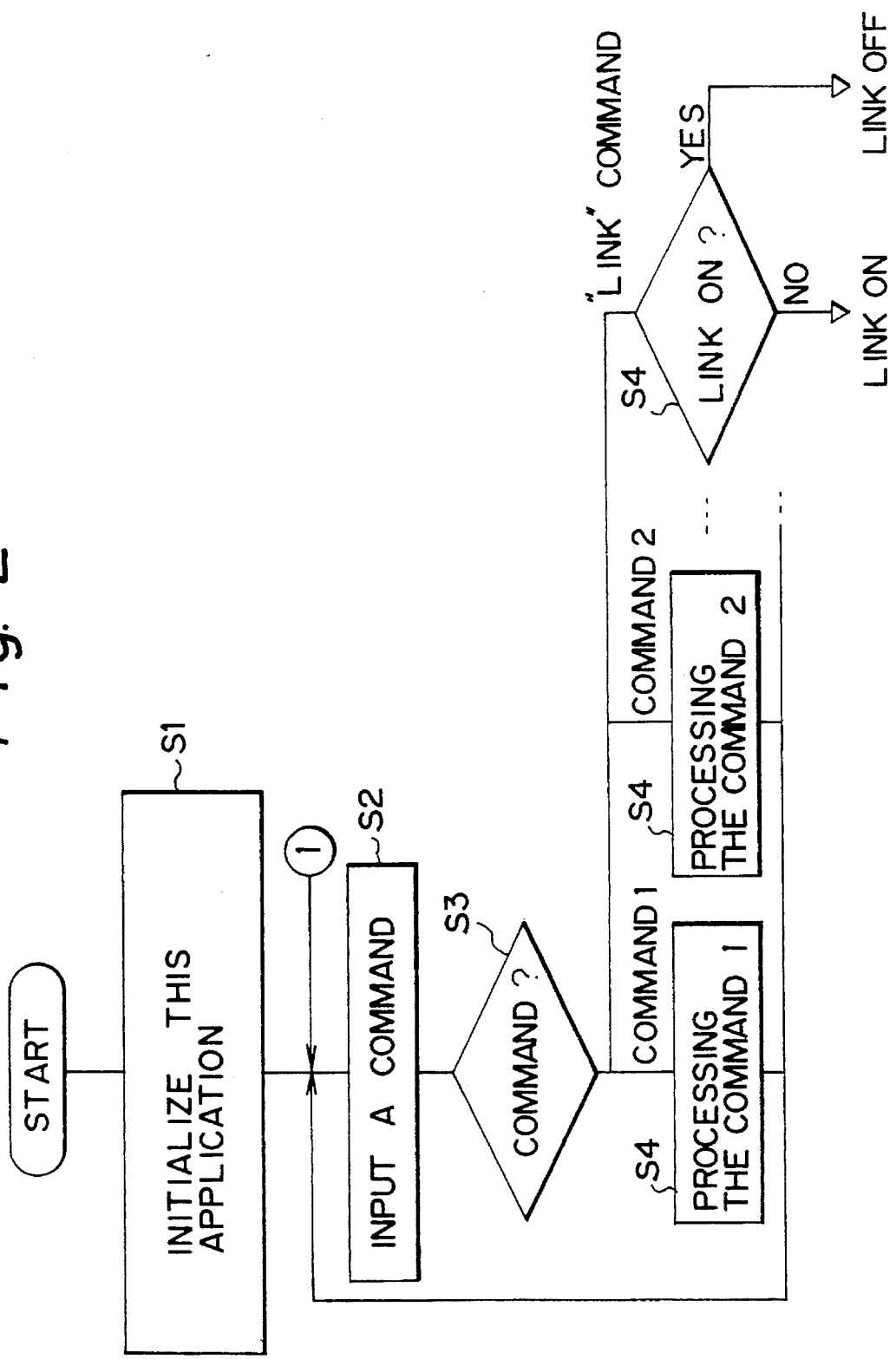
FIG. 2 is a flowchart showing processing of an application executed in the system shown in FIG. 1.

At first, the description will be oriented to the procedure of the application. As shown in FIG. 2, at a step S1, the necessary initialization is executed for a displaying operation of the main body 1 and an application stored in a working area of the RAM. At a step S2, a desired command for processing is input by an operator through a menu selection or keying. Then, if it is determined that the input is a command at a step S3, the proper processing for the input command is executed at a step S4. This is the same as the common processing method of the application in such a main body 1.

In the main body 1 of the invention, a "LINK" command is provided. Relative to the command, "LINK ON" indicates that the main body 1 is connected to the annexed display device 2 through the communication facility 3 and the display device 2 is in use. "LINK OFF" indicates the opposite state, that is, that the display device 2 is not in use. Herein, when "LINK ON" is given, no "LINK ON" command is input and when "LINK OFF" is given, no "LINK OFF" command is input. Hence, if "LINK OFF" is given (NO), the "LINK ON" processing is executed. If "LINK ON" is given (YES), the "LINK OFF" processing is executed. This routine holds true to the display device 2, except that no "LINK ON" is indicated by the "LINK" command, because the main body 1 is connected to the display device 2 when the "LINK OFF" is given. It means that only the main body 1 needs the "LINK ON" processing. The display device 2 provides the processing corresponding to the "LINK ON" processing in the power off processing, which will be described later.

Figure 3A:
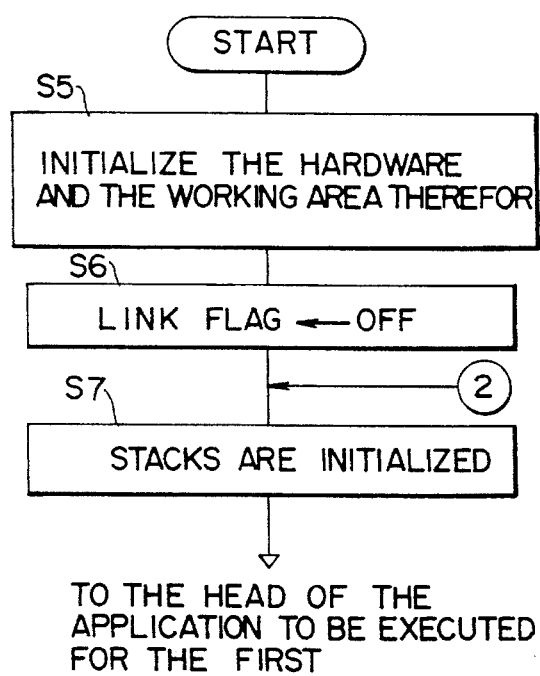
FIG. 3a is a flowchart showing a reset processing executed in a main body of the system.
Figure 3B:
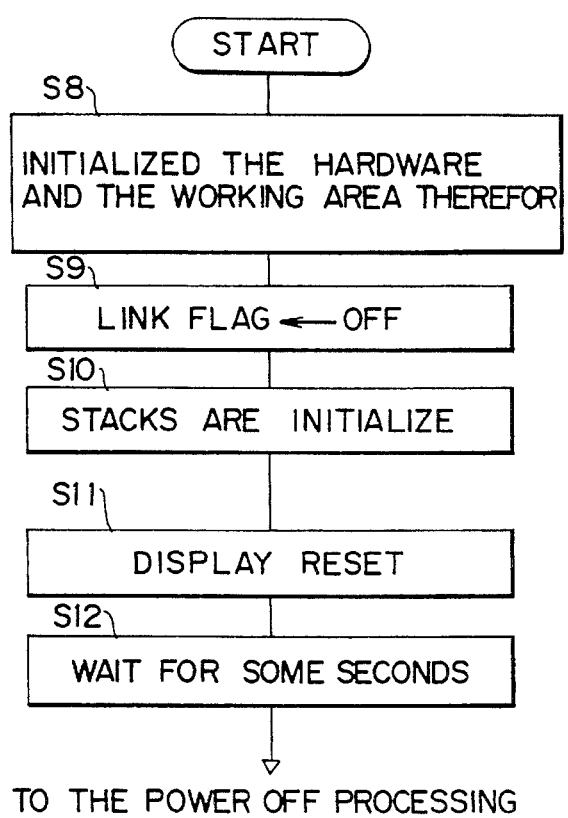
FIG. 3b is a flowchart showing a reset processing executed in a display device of the system.

Turning to FIG. 3a, 3b, the reset processing of the main body 1 is shown in FIG. 3a and the reset processing of the display device 2 is shown in FIG. 3b. For the processing shown in FIG. 3a, like the known techniques, at a step S5, the hardware and the work area used therefore are initialized. A LINK flag is set to "OFF" at a step S6. Then, stacks and the relevant parts are initialized at a step S7. Then, the operation goes to the application processing shown in FIG. 2.

For the processing shown in FIG. 3b, like the main body 1, the display device 2 and the work area used therefore are initialized at a step S8. The LINK flag is set to "OFF" at a step S9. Then, stacks and the relevant parts are initialized at a step S10. Then, "RESET" is displayed on the display section 2d at a step S11. After waiting for some seconds at a step S12, the operation goes to the power off processing shown in FIG. 6b.

Figure 4:
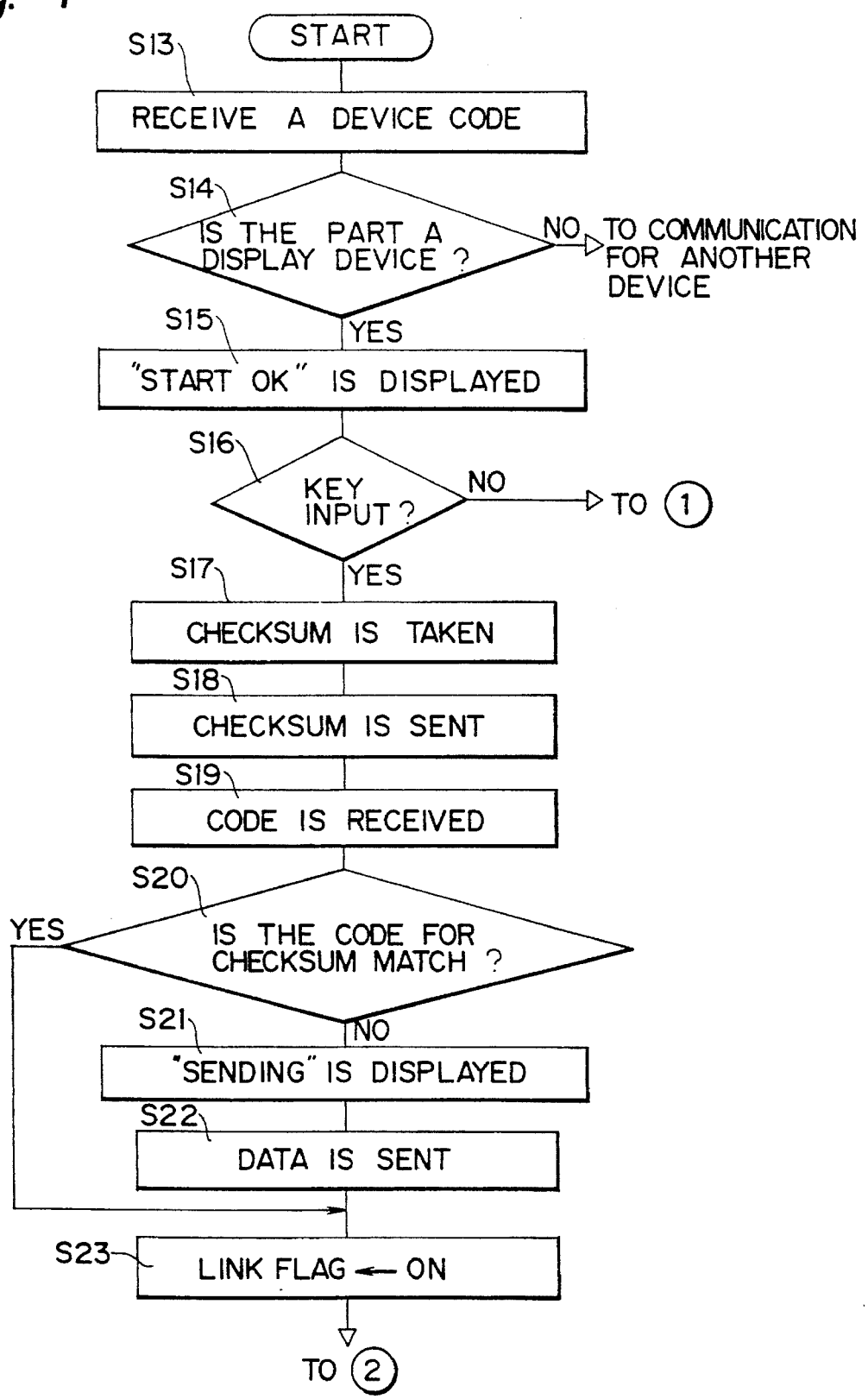
FIG. 4 is a flowchart showing a "LINK ON" processing executed in the system.

FIG. 4 is a flowchart showing the "LINK ON" processing. At the step S3 shown in FIG. 2, the "LINK" command is selected. At the step S4, the operation goes to the "LINK ON" processing, that is, enters into the processing shown in FIG. 4. Since a general-use communication port served as the communication facility 3 is connected between the main body 1 and the display device 2, in addition to the display device 2, the data transfer between the systems and the connection of various devices such as option equipment are made possible. It is therefore necessary to define a code for each equipment to be connected. The main body 1 determines which equipment is now being connected by referring to the defined code received therein (at steps S13 to 14). If it does not indicate the display device 2 (NO), the corresponding processing to the equipment indicated by the code is started to do. On the other hand, if it indicates the display device 2 (YES), the starting processing of the display device 2 is started.

In the first of the "LINK ON" processing, a message "START OK" is indicated in the display section 1d at a step S15. At a step S16, it is determined whether or not the display device 2 is in use. An operator operates the handling section 1b to key "YES" for giving a confirmation to the message. On the other hand, if "NO" is keyed, the operation is branched to the routine 1. If the confirmation is obtained, the processing section of the main body 1 operates to take a checksum of a data area and a working area for the application in the RAM 1c at a step S17 and send the checksum to the display device 2 at a step S18. The processing section 2a of the display device 2 also operates to take a checksum of a data area and a working area for the application in the RAM 2c. This checksum is compared with that sent from the main body 1 at step S19 and S20. If both are different from each other (NO), it means that the content of the RAM 1c is different from the content of the RAM 2c. To make both of them equal to each other, it is necessary to inform the operator of the difference through a message "SENDING" on the display section 1d at a step S21. This message requires the operator to transfer the content of the data area of the RAM 1c of the main body 1 to the data area of the RAM 2c of the display device 2. Then, the data transfer is executed at a step S22. The data transfer results in making the contents of both RAMs 1c and 2c be equal to each other. Then, the LINK flag is set to "ON" so that the "LINK ON" processing may be terminated at a step S23. And, to match the phase of the main body 1 to that of the display device 2, the operation is branched to the routine 2 in which the phase matching is done (step S7). The operation goes to the processing shown in FIG. 2. Later, both on the main body 1 and the display device 2, the same application is executed at the same step. If the checksum of the main body 1 is equal to that of the display device 2, the same processing as above is also carried out (step S20 to the routine 2).

As described above, on the condition that the main body 1 is not solely used in the state of —LINK ON" before ordering "LINK ON" at this time, it is not necessary to transfer the data in the data area. For example, if the system is used for presentation, the time taken in transferring data when actually facing the presentation is not necessary if "LINK ON" is given beforehand.

Figure 5A:
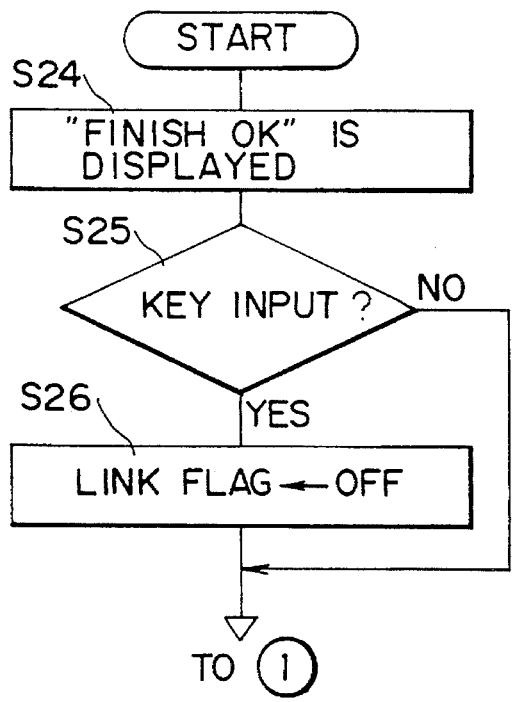
FIG. 5a is a flowchart showing a "LINK OFF" processing executed in the main body of the system.
Figure 5B:
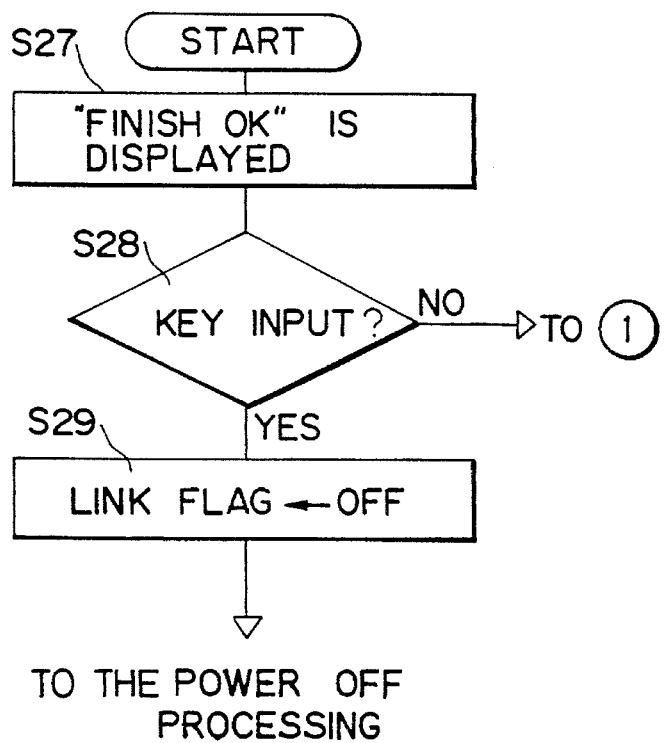
FIG. 5b is a flowchart showing a "LINK OFF" processing executed in the display device of the system.

FIG. 5a is a flowchart showing how the main body 1 performs the "LINK OFF" processing. FIG. 5b is a flowchart showing how the display device 2 performs the "LINK OFF" processing. In any case of the "LINK OFF" processing for the main body 1 and that for the display device 2, basically, a message "FINISH OK" is displayed on the display section 1d or 2d (at a step S24 or S27) for confirmation (at a step S25 or S28). Then, an operator operates the operating section 1d to input "YES" or "NO" with keys. If "NO", the operation goes to the routine 1. If "YES", the LINK flag is set to "OFF" (at a step S26 or S29). Then, for the main body 1, the operation goes to the routine 1. For the display device 2, the operation goes to the power off processing shown in FIG. 6b.

Figure 6A:
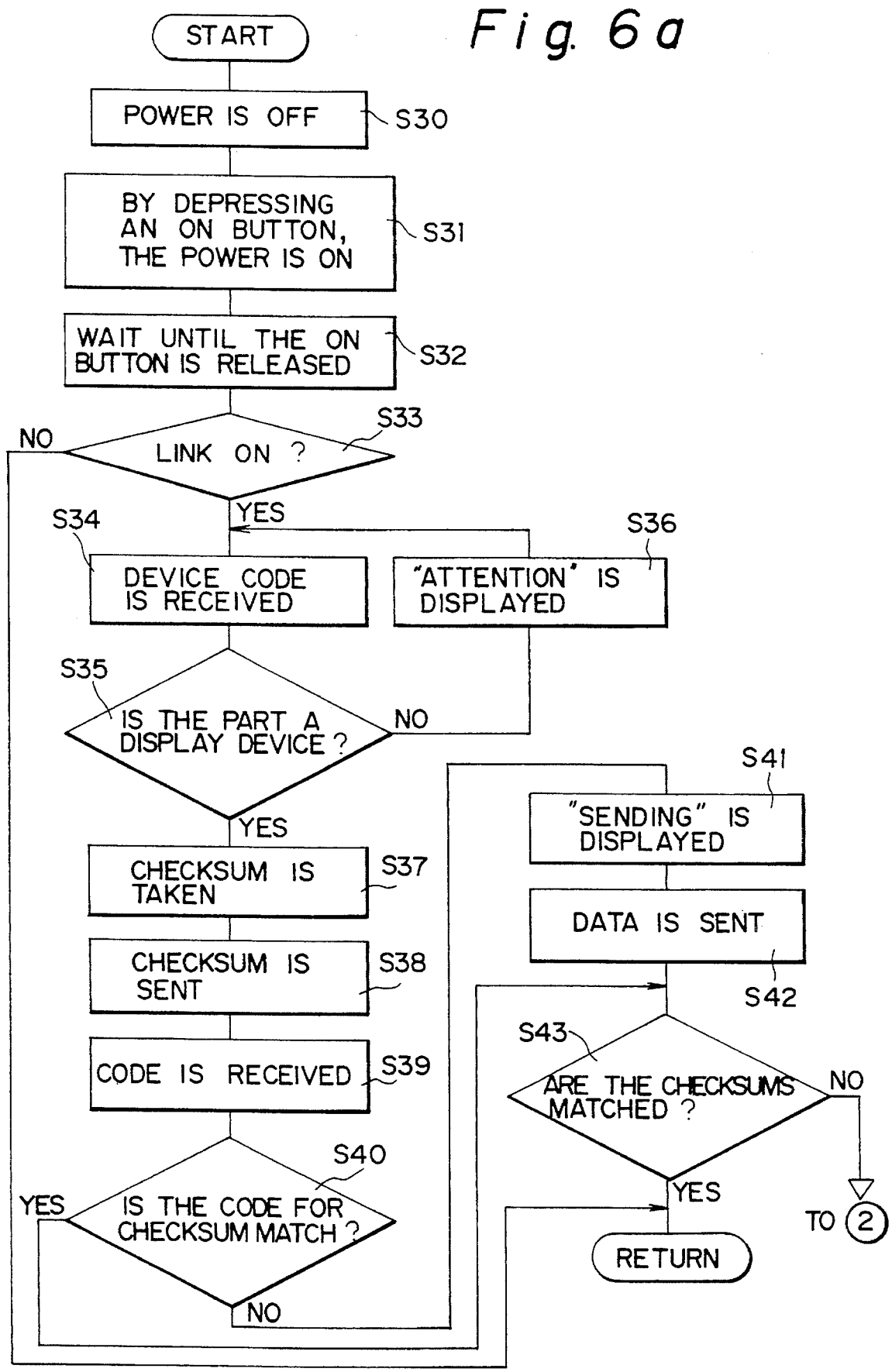
FIG. 6a is a flowchart showing a power off processing executed in the main body of the system.

FIG. 6a is a flowchart showing the power off processing for the main body 1. FIG. 6b is a flowchart showing the power off processing for the display device 2. When an "OFF" key is pressed and the power is turned off, the processing is done according to the flowcharts. If an "ON" key is turned, the operation returns to the main routine.

In FIG. 6a, the power is turned off at a step S30. Then, the "ON" key is pressed for turning the power on at a step S31. Then, the operation waits until the "ON" key is released at a step S32. Next, it is determined whether or not the state is "LINK ON" at a step S33. If "LINK OFF" is given (NO), the power is turned on and then the operation returns to the main routine. On the other hand, if "LINK ON" is given (YES), it indicates a possibility that the communication cable is disconnected or a party to be communicated is changed to another. Hence, the similar processing to the "LINK ON" processing shown in FIG. 4 has to be executed. The main body 1 receives a device code of the device being connected to the system at a step S34. Turning to a step S35, it is determined whether or not the party is the display device 2 at a step S35. If it is not the display device 2 or nothing is connected (NO), an error message "attention" is displayed on the display section 1d at a step S36. Again, the operation is executed to receive a code at the step S34 to S35. On the other hand, if the party is the display device 2 (YES), the processing section 1a of the main body 1 takes a checksum of the data area and the working area for the application in the RAM 1c at a step S37. Then, the checksum is sent to the display device 2 at a step S38. On the display device 2, the processing section 2a takes a checksum of the data area and the working area for the application in the RAM 2c. Then, the checksum is compared with the checksum sent from the main body 1 at step S39 to S40. If both of the checksums are different from each other (NO), it indicates the difference between the content of the RAM 1c and that of the RAM 2c. To make the contents of the RAMs 1c and 2c equal to each other, it is necessary to transfer the data in the data area of the RAM 1c from the main body 1 to the display device 2. To inform the operator of this necessity, a message "SENDING" is displayed on the display section 1d at a step S41 and then the data is transferred at a step S42. On the other hand, if NO at the step S33, it means the display device before the power off. Hence, the operation directly returns to the main routine. Then, it is determined whether or not the checksums are matched to each other at a step S43. If no, the operation goes to a routine 2 at which phase matching is done. If yes, the operation just returns to the main routine.

FIG. 6b shows the power off processing for the display device 2, which corresponds to the "LINK ON" processing shown in FIG. 4. This processing is executed after the reset processing or the "LINK OFF" processing, except that the power is turned off. When the "LINK ON" is given, this processing is similarly executed, because the same content is communicated when the power is turned on. After the reset processing or the "LINK OFF" processing, the "LINK OFF" state appears. When the power is turned off, the "LINK ON" state appears. It is possible to distinguish what processing is to be done before the power off processing.

The description will be oriented to the flowchart shown in FIG. 6b. At first, the operation waits for one second at a step S44. At a step S45, it is determined whether or not the display device 2 is connected to the main body 1 being turned on. If yes, the operation goes to a step S48. If no, the power is turned off at a step S46. By pressing the "ON" button, the power is turned on at a step S47. When the main body 1 and the display device 2 are powered off, the power-off of the display device 2 is a bit delayed. This is effective if the power control circuit is combined with the system. That is, the display device 2 is turned off before the main body 1. In this state, since the main body 1 is turned on, the power control circuit is operated to prevent the display device 2 from being powered on immediately after the display device is turned off.

Next, at a step S48, it is determined if the "LINK ON" state appears. If no, at a step S49, a message "STAND BY" is displayed on the display section 2d. Then, at a step S50, the device code is sent to the main body 1. The processing section 2a operates to take a checksum of the RAM 2c, receive a checksum from the main body 1 and compare both of the checksums with each other at steps S51 to S53. If both of the checksums are matched to each other (YES), a matching code is sent at a step S57. On the other hand, if both of the checksums are not matched to each other (NO), non-match code is sent at a step S54. It means that the content of the RAM 1c is different from that of the RAM 2c. To make both of them equal to each other, it is necessary to receive the data in the data area of the RAM 1c from the main body 1. To inform the operator of the difference, a message "RECEIVING" is displayed on the display section 2d at a step S55. At this time, the display section 1d of the main body 1 displays a message "SENDING" Then, the data is received at a step S56. This results in making the content of the RAM 1c equal to that of the RAM 2c. Then, it is determined if the "LINK ON" state appears at a step S58. If no, at a step S60, the LINK flag is set to "ON". the operation goes to the routine 2 in which the phase matching is done. On the other hand, in the state of "LINK ON" (if yes at the step S58), if the checksums are matched (if yes at the step S59), the operation returns to the main routine. If the checksums are not matched to each other (NO), it means that another device is connected to the display device. The operation goes to the routine 2 in which the operation phases are matched to each other.

Figure 7A:
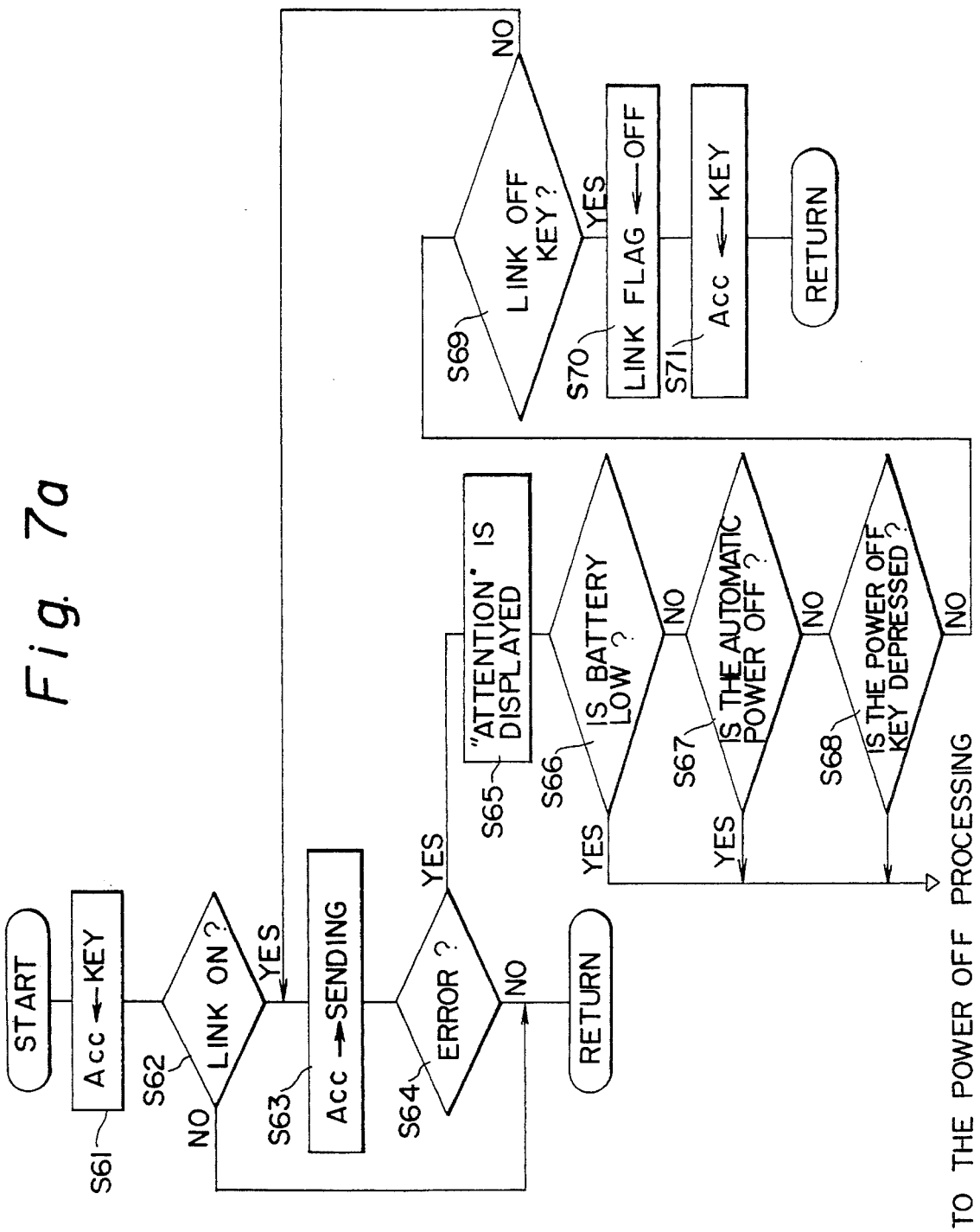
FIG. 7a is a flowchart showing a keying processing executed in the main body of the system.
Figure 7B:
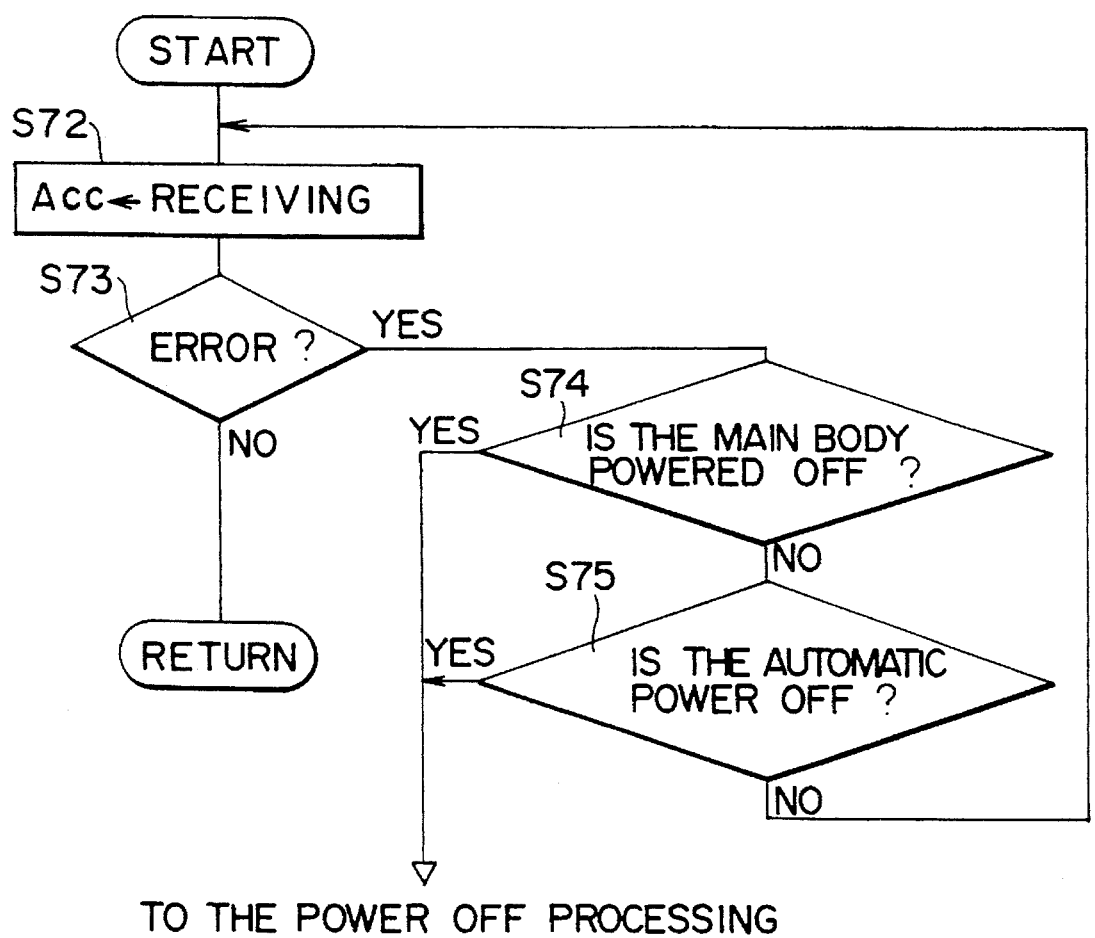
FIG. 7b is a flowchart showing a keying processing executed in the display device of the system.

FIG. 7a is a flowchart showing how a keying operation is done for the main body 1. FIG. 7b is a flowchart showing how a keying operation is done for the display device 2. In general, the read key code is put into Acc and then the operation returns to the main routine.

In Fig. 7a, by handling the handling section 1b, the keys are pressed. Herein, the main body 1 serves to put the read key codes to Acc at a step S61. And, at a step S62, it is determined whether or not the "LINK ON" state appears. If it is not in the state of "LINK ON" (NO), the operation returns to the main routine. On the other hand, if it is in the state of "LINK ON" (yes), the keycode is sent from the Acc to the display device 2 at a step S63. If it is properly sent (if no at a step S64), the operation returns to the main routine for the next keying input with the sent code being held. On the other hand, if an error takes place (if yes at the step S64), at a step S65, a message "attention" appears on the display section 1d for meaning an error. Then, it is determined if a battery is low (step S66), the automatic power is turned off (step S67), or the key input is for turning off the power (step S68) in order to check for the cause of this error. If the cause is one of the above ones (YES), the operation goes to the power off processing. If no, at a step S69, it is determined whether or not a key input is for "LINK OFF." If yes, the "LINK" flag is turned off at a step S70. Then, the key input is read again at a step S71. The operation returns to the main routine. On the other hand, if the key input is not for "LINK OFF" (NO), it means that the actual cause does not correspond to any one of them. The cause is disconnection of the communication cable. Again, the communication is retried.

In FIG. 7b, the display device 2 receives the key code from the main body 1 and inputs the key code to Acc at a step S72. If no error takes place (NO), the operation returns with this code being held. On the other hand, if an error takes place (YES), it is determined if the main body 1 is powered off (step S74) or the automatic power is turned off (step S75). If yes, the operation goes to the power off processing. On the other hand, if no, the cause is disconnection of the communication cable. Again, the communication is retried.

In succession, the "LINK" operation will be described. After resetting, the main body 1 is initialized as shown in FIG. 3A. Then, a command is input according to the flowchart shown in FIG. 2 and the processing for the command is executed. In the case of inputting the command, the key code is returned as shown in FIG. 7a. On the other hand, for the display device 2, after resetting it according to the procedure shown in FIG. 3B, the reset message is displayed and the power is turned off shown in FIG. 6b.

Consider the main body 1 and the display device 2 are powered on in the state that the main body 1 is connected to the display device through the communication device 3. A message "STAND BY" is displayed on the display section 2d of the display device 2 (step S49 of FIG. 6). If the "LINK" command is selected on the side of the main body 1 (steps S3 to S4 of Fig. 2), for the main body 1, the processing shown in FIG. 4 is executed and for the display device 2, the processing shown in FIG. 6B is executed through the communication device 3. Then, both of the processings go to the routine 2 shown in FIG. 3. As a result, the same application runs on both the main body 1 and the display device 2. After this state, the key code input by handling the handling section 1b of the main body 1 is transferred to the side of the display device 2 shown in FIG. 7. Hence, the same processing on the key code is executed on both of the processing sections 1a and 2a. The processed result is displayed on the display sections 1d and 2d at a time.

Then, when the "LINK OFF" is selected by the "LINK" command again, the "LINK ON" state is continued until the termination about "LINK" is confirmed. Hence, the key code is transferred so that the same processing is executed. After the "LINK OFF", by turning off the "LINK" flag on the side of the main body 1, the subsequent key code is not transferred so that the main body 1 may be solely operated. On the other hand, for the display device 2, the operation goes to the power off processing. As a result, the waiting state for "LINK" appears.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic connecting system comprising:

an electronic main body for inputting data through keys, and processing key codes based on application data, and displaying a processed result, and sending said key codes and said application data to a display device, said electronic main body including a first storage means for storing application data;

said display device receiving said key codes and said application data from said electronic main body, and processing said key codes based on said application data, and displaying a processed result, said display device including a second storage means for storing application data;

a communication device for connecting said electronic main body with said display device; and a link-on means for executing a same application on both said main body and said display device, and link-on means including means for taking a first checksum of a first data area and a first working area for an application in said first storage means, means for taking a second checksum of a second data area and a second working area for an application in said second storage means, means for comparing said second checksum with said first checksum, means for transferring content of said first data area and said first working area for said application in said first storage means to said second storage means if said first checksum is different from said second checksum, and means for sending a key code from said main body to said display device.

2. An electronic connecting system according to claim 1, wherein said electronic main body further includes input means for inputting data through keys, first processing means for processing key codes input by said input means based on the application data stored in said first storage means, first display means for displaying a result processed by said first processing means, and first communication means for communicating said key codes input by said input means and said application data stored in said first storage means.

3. An electronic connecting system according to claim 1, wherein said display device further includes second communication means for communicating key codes and application data communicated from said first communication means, second processing means for processing said key codes processed by said second communication means based on said application data stored in said second storage means, and second display means for displaying a result processed by said second processing means.

4. An electronic connecting system according to claim 1, further comprising LINK ON means for executing a same application on both said main body and said display device having means for executing the same application on both said main body and said display device, means for transferring key code input from said input means of said main body to the display device, means for executing a same processing on the key code on both said main body and said display device.

5. An electronic connecting system according to claim 2, wherein said first processing means includes means for taking a checksum of a data area and a working area for the application in said first storage means and means for sending said checksum to said display device.

6. An electronic connecting system according to claim 3, wherein said second processing means includes means for taking a checksum of a data area and a working area for the application in said second storage means and means for comparing this checksum with said checksum sent from said main body.

7. An electronic connecting system according to claim 1, wherein said communication device supports a general-use communication port.

* * * * *